United States Patent [19]

Klamer et al.

[11] Patent Number: 4,956,775

[45] Date of Patent: Sep. 11, 1990

[54] OBJECT SENSOR FOR DETECTING CHARACTERISTICS SUCH AS COLOR FOR GAMES

[76] Inventors: Reuben B. Klamer, 969 Hilgard Ave. - Suite 1001; David I. Lappen, 10427 Linbrook Dr., both of Los Angeles, Calif. 90024; William A. Lappen, 2167 Kenilworth Ave., Los Angeles, Calif. 90039; Beatriz E. Pardo, 2234-A Bentley Ave., Los Angeles, Calif. 90064

[21] Appl. No.: 782,557

[22] Filed: Oct. 1, 1985

[51] Int. Cl.[5] ...................... G06F 15/28; A63B 67/00; A63B 63/02

[52] U.S. Cl. ................................ 364/411; 273/1 ES; 273/15 A

[58] Field of Search ........................ 364/400, 410–412, 364/513, 525–526, 555, 575; 273/1 R, 1 E, 1 ES, 1.5 R, 1.5 A, 371–374, 410, DIG. 28, 118 A

[56] References Cited

U.S. PATENT DOCUMENTS

| | | | |
|---|---|---|---|
| 2,893,734 | 7/1959 | Tarte, Jr. | 273/1.5 R X |
| 3,137,503 | 6/1964 | Ballard | 273/1.5 R |
| 3,362,712 | 1/1968 | Wagner | 273/374 X |
| 3,825,257 | 7/1974 | Palmer | 273/374 X |
| 4,013,292 | 3/1977 | Cohen et al. | 273/371 X |
| 4,132,314 | 1/1979 | von Beckmann et al. | 364/526 X |
| 4,412,293 | 10/1983 | Kelley et al. | 364/513 |
| 4,414,635 | 11/1983 | Gast et al. | 364/526 |
| 4,486,842 | 12/1984 | Hermann | 364/513 |
| 4,533,141 | 8/1985 | Foley et al. | 373/118 A X |
| 4,565,527 | 1/1986 | Burchett | 273/371 X |

*Primary Examiner*—Gary V. Harkcom
*Assistant Examiner*—John A. Merecki
*Attorney, Agent, or Firm*—Irell & Manella

[57] ABSTRACT

An object sensor (or event detector) apparatus detects distinctive characteristics (such as color) of otherwise physically similar objects. Respective indices or counters are incremented in response to the various detections. The event detector (object sensor) may take various forms such as a conveyor belt production monitor, but is especially useful as an electronic scorekeeper for a competitive game which simultaneously keeps score for two or more different players by distinguishing between the different colors (or other characteristics) of balls or other objects each player uses to play a given game. A solitary mode also keeps score for a single player within a given time period. In this selectable alternative mode, the event detector apparatus records accumulated points and displays the time remaining in a given time period which defines a game time period.

6 Claims, 6 Drawing Sheets

OBJECT SENSOR FOR DETECTING CHARACTERISTICS SUCH AS COLOR FOR GAMES

BACKGROUND AND SUMMARY OF THE INVENTION

Prior art sensors commonly detect the presence or absence of an object, but do not detect other characteristics (such as color) not directly detectable by measuring the physical dimensions of the detected articles. This invention provides in general an apparatus for detecting both the presence of objects and predetermined characteristics thereof. Specifically disclosed is an embodiment useful with games played with one or more balls by one or more players.

Conventionally, event detection constituting scorekeeping for games (competitive or individual play) has been performed manually by an observer or mentally by one or more of the participants. Scorekeeping may also be done manually by a participant, but that destroys the game's continuity and enjoyment. Also, additional drawbacks are that manual scorekeeping by a nonparticipant requires an extra person, and mentally kept scores are frequently inaccurate and subject to argument during the game.

This invention, in one aspect, may be embodied as an automatic scorekeeping device, both for games of solitaire and for two-party games played by two or more persons with one or more balls. Two-party games present a particularly difficult problem, for even after a scoring event (e.g., presence of a ball, etc.) is detected, it must further be determined which player has scored. Since in most games the physical effects of scoring are outwardly identical (e.g., ball falling through hoop, ball over goal, etc.), determining automatically which party has scored is impossible with the use of prior art event detectors which only detect the presence or absence of an object.

This invention recognizes the limitations of the prior art and provides a solution to its shortcomings by disclosing an electronic scorekeeping device (event detector or object sensor) which not only automatically determines when a particular physical phenomenon such as a scoring event has occurred, but also determines which player has scored by distinguishing unique characteristics associated with respective player's game implements. In one embodiment, this is accomplished by assigning a different color to each player's game implement (ball) and, when a scoring event is sensed, determining which color implement (and hence which player) effected the score. Thus, for example, if player (or team) A's red basketball is thrown through a hoop, player A's score is automatically incremented, but not the score of player (team) B, who uses a different colored ball (such as yellow).

In operation, these features may be accomplished in one form as follows. Whenever a predetermined event (such as a score) is sensed, a light output (such as an LED or light emitting diode) illuminates the scoring area (e.g. goal area) and a photosensitive element (such as a phototransistor) measures the amount of light reflected from the game implement (e.g., ball). The reflectivity of the implement (ball) is used to identify it. For example, if a relatively large amount of light is reflected, the ball is determined to be the lighter of the two, while a relatively small amount of reflected light indicates the darker of the two balls. In this manner, players using different colored balls with corresponding different reflectivities are distinguished. Another feature of this invention is that it quickly performs a plurality of samples of the ball's reflectivity when a scoring event occurs, thereby reducing the probability of an erroneous reflectivity reading.

The following detailed description describes an event detector or object sensor in accordance with the present invention which is particularly suited for scorekeeping games, especially basketball games. It should be well understood that the features of this invention equally pertain to other games (such as football, soccer or tennis variations), and even to other environments such as detecting and comprehending the passage of assembly line items.

BRIEF DESCRIPTION OF THE DRAWINGS

Those skilled in the art will recognize and appreciate the many modifications and variations within the broad scope of this invention after having a fuller understanding thereof, as will result from a study of the following description and drawings, in which.

DETAILED DESCRIPTION OF THE PREFERRED EMBODIMENT

Figure 1:
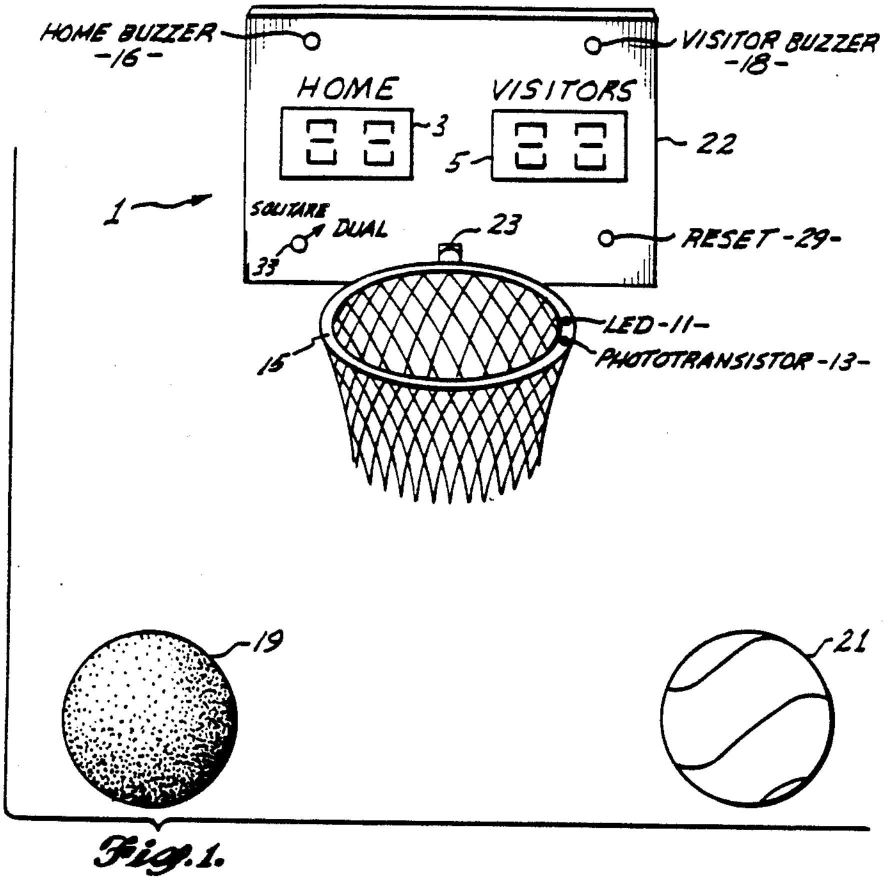
FIG. 1 illustrates one embodiment of the present invention particularly applicable to basketball play.

FIG. 1 illustrates a preferred embodiment of this event detector invention constituting an automatic scorekeeper 1, especially applicable to the game of basketball (or throwing balls through a hoop). In this basketball embodiment, each team (or player) selects one basketball having at least one unique characteristic (such as color) with respect to other balls available. For example, either light ball 21 or dark ball 19 is selected. Light ball 21 may be defined to correspond to a HOME team, whose point total is displayed on the backboard via a display means, such as 7-segment LEDs 3. Alternatively, an electromechanical scoring means such as dials or rotating indicators can be used and controlled to display the score. Dark ball 19 may be defined to correspond to a VISITING team, whose point total is similarly displayed via LEDs 5.

Each time a ball passes through the hoop, the appropriate team's or player's score is increased by two points and a respective buzzer 16 or 18 corresponding to the indicated (scoring) team is sounded. Respective buzzers 16 and 18 may make different sounds to provide audibly distinctive scoring feedback. Alternatively, instead of two buzzers one buzzer or sound producing element can be used and controlled by software to oscillate at different frequencies to produce two different sounds. Thus, to play a game, each player or team need only choose a ball and shoot (after initialization steps have been taken, as discussed further below). The scoring for the HOME team as well as that of the opposing VISITOR team is automatically separated and respectively recorded and displayed by the LEDs. Manual scorekeeping is totally unnecessary.

The hoop 15 is mounted on a backboard 22, which backboard may be attached directly to a wall or mounted on a stand, pole or similar article.

To determine which ball has passed through hoop 15, electrical contact switch 23 is mounted on or near hoop 15 so that it is actuated by a ball passing therethrough (or, in the case of a proximity switch, nearby). The output of contact switch 23 is monitored by the electronic circuitry contained within backboard 22 (or alternatively in hoop 15), which circuitry uses the contact switch output to determine the presence of a ball.

Whenever a ball is detected, LED 11 (mounted on or in hoop 15) is energized to thereby illuminate the immediate inner hoop area, including the detected ball passing therethrough. Phototransistor 13 then measures the amount of light emitted from LED 11 which is reflected by ball 19 or 21, and thus determines whether the ball is relatively light or dark, since the amount of reflected light varies with the color (or even tint) of the ball.

In order to increase the reliability of the ball color determination by the phototransistor, a plurality of reflectivity readings are taken as the ball passes through the hoop. The average of all the readings is calculated and is deemed to be the actual ball color for that scoring event. Relative to a single or lesser number of samples, this averaging process greatly enhances the reliability of the color (or other physical characteristic) determination.

The basketball game may also be played in a solitairy mode by moving selector switch 33 from the "dual" play position to the "solitaire" play position. In the solitairy mode, the visitor's display is used as a seconds countdown timer. Depressing reset button 29 resets a built-in timer to 99 seconds and the timer then begins its countdown to 0. Either ball passing through hoop 15 during the 99 second period registers two additional points on the home team display and rings the home team's buzzer. If desired, either ball passing through the hoop in this solitaire mode could increment the score by one instead of two. When the clock reaches 0, the visiting team's buzzer sounds to alert the player that the game is over. The solitary mode thus allows a single player to perfect his game by playing "against the clock", and displays an automatic measure of his daily progress (raw point score in the given time period).

Figure 2:
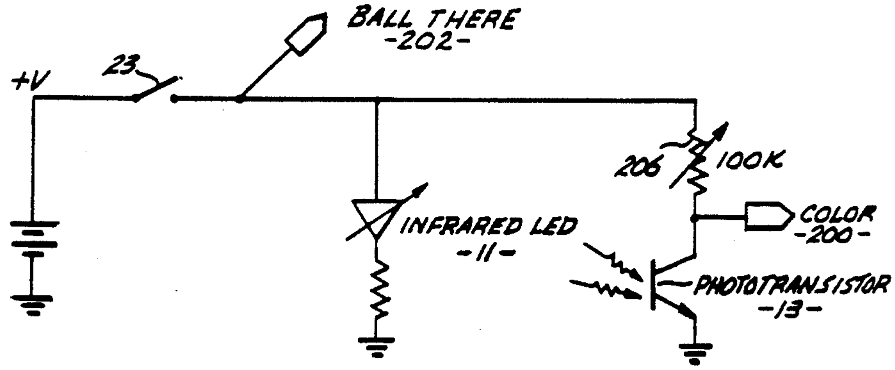
FIG. 2 illustrates an in-hoop sensor for use with the embodiment of FIG. 1.

FIG. 2 illustrates one electronic circuit embodiment comprising the in-hoop ball sensor in FIG. 1. Normally open electronic contact switch 23 (BALL THERE) is closed (as aforenoted) whenever a ball passes through hoop 15. BALL THERE (202) is a digital program variable (discussed further below) which signals that color sampling of the ball must be initiated, and is connected to the input port of a microprocessor. Closure of switch 23 also supplies power to LED 11 and phototransistor 13, both of which otherwise remain unpowered in order to conserve power, since the present invention may be battery powered for portability (or adapted to receive and operate on household current).

Once BALL THERE switch 23 is closed, LED 11 illuminates the ball in the hoop, and the light reflected from the ball is sensed by phototransistor 13. Variable resistor 206 enables adjustment of phototransistor 13's output level so that the amount of light normally reflected from a "light" ball and received on phototransistor 13 will saturate the transistor and drive output 200 (COLOR) low. Variable resistor 206 is also adjusted so that the amount of light normally reflected from a "dark" ball will not saturate the transistor and hence not drive output 200 (COLOR) low. Output 200 (COLOR), is connected to the microprocessor, thus indicating thereto the color (i.e., reflectivity) of the ball in hoop 15.

Figure 5:
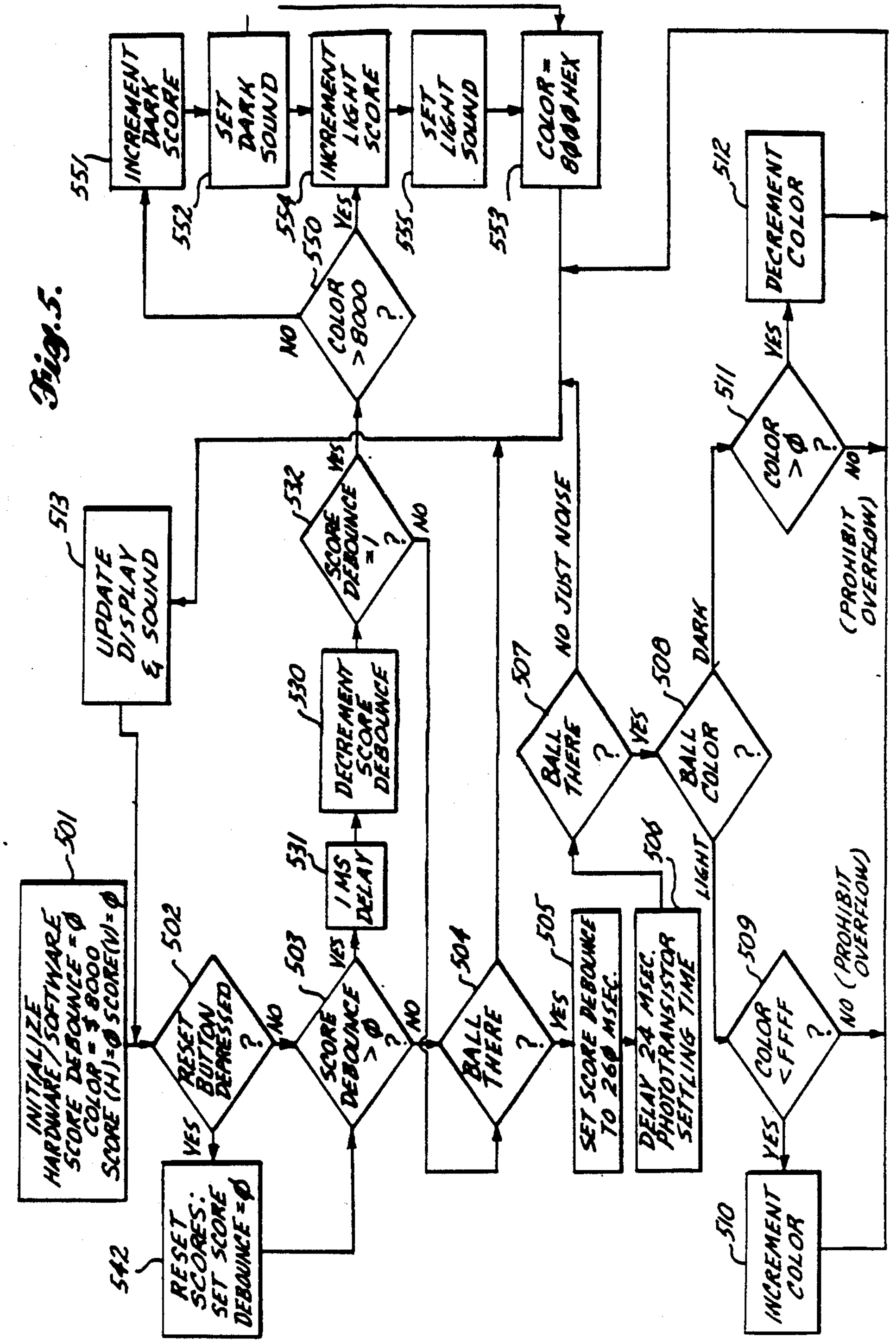
FIG. 5 is a flow chart for operation of the FIGS. 3A and 3B apparatus in a two-or-more players (competitive) mode.
Figure 6:
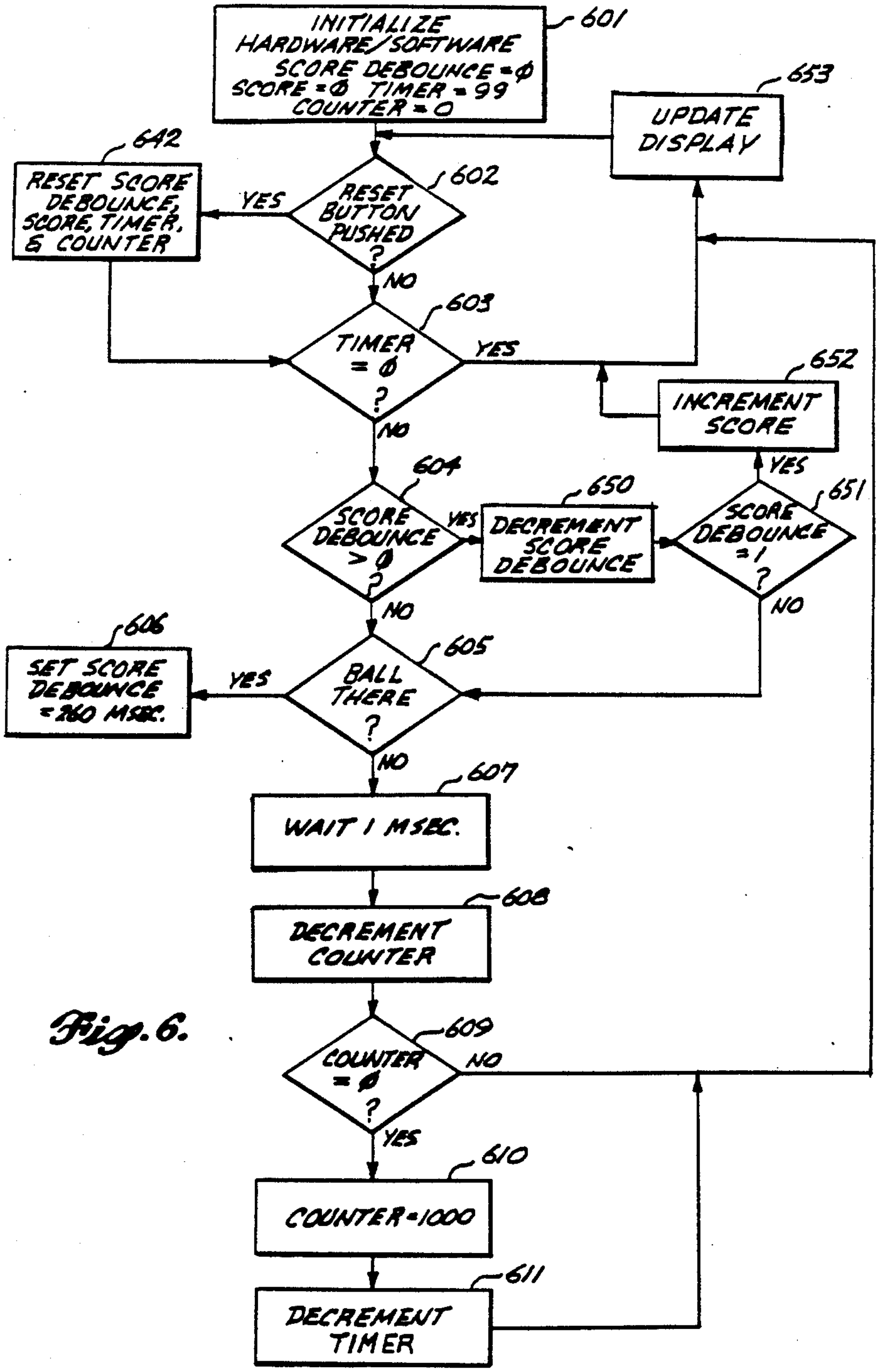
FIG. 6 is a flow chart for operation of the FIGS. 3A and 3B and 4 apparatus in a single player (solitaire) mode.

FIGS. 3 A and B illustrate one preferred embodiment of the scorekeeper's electronic circuitry, which operates in accordance with the program flow charts shown in FIGS. 5 and 6. The program is stored in ROM 301 (preferably a 2716), and is executed by microprocessor 303 (preferably a Z-80). RAM 302 (preferably a 6116) stores the program's dynamic variables. Interface of the microprocessor with LEDs 3, 5, phototransistor 13, LED 11, reset button 29, and solitaire/dual switch 33, is accomplished with parallel input/output port 306 using conventional technology.

Parallel I/O port 306 drives LEDs 3 and 5 by means of driver 308, preferably a 74LS49. Each of the seven segments of each LED comprising displays 3 and 5 is connected in parallel with each of the seven segments of the other 3 LEDs, thus necessitating only seven, not 28, driving lines. Individual LEDs are selected by enabling the common cathode "turn on" line of appropriate LED by the standard output leads B4-B7 of I/O port 306). Thus, at a given time only one LED is driven, yet the frequency of refreshing each driven LED is such that no flicker is visible.

COLOR signal 200 and BALL THERE signal 202 (from FIG. 2) are provided from the in-hoop sensor 23 to input ports 12 and 10 on parallel I/O port 306 as described above and are interfaced therewith by means of conventional buffers.

Figure 3A:
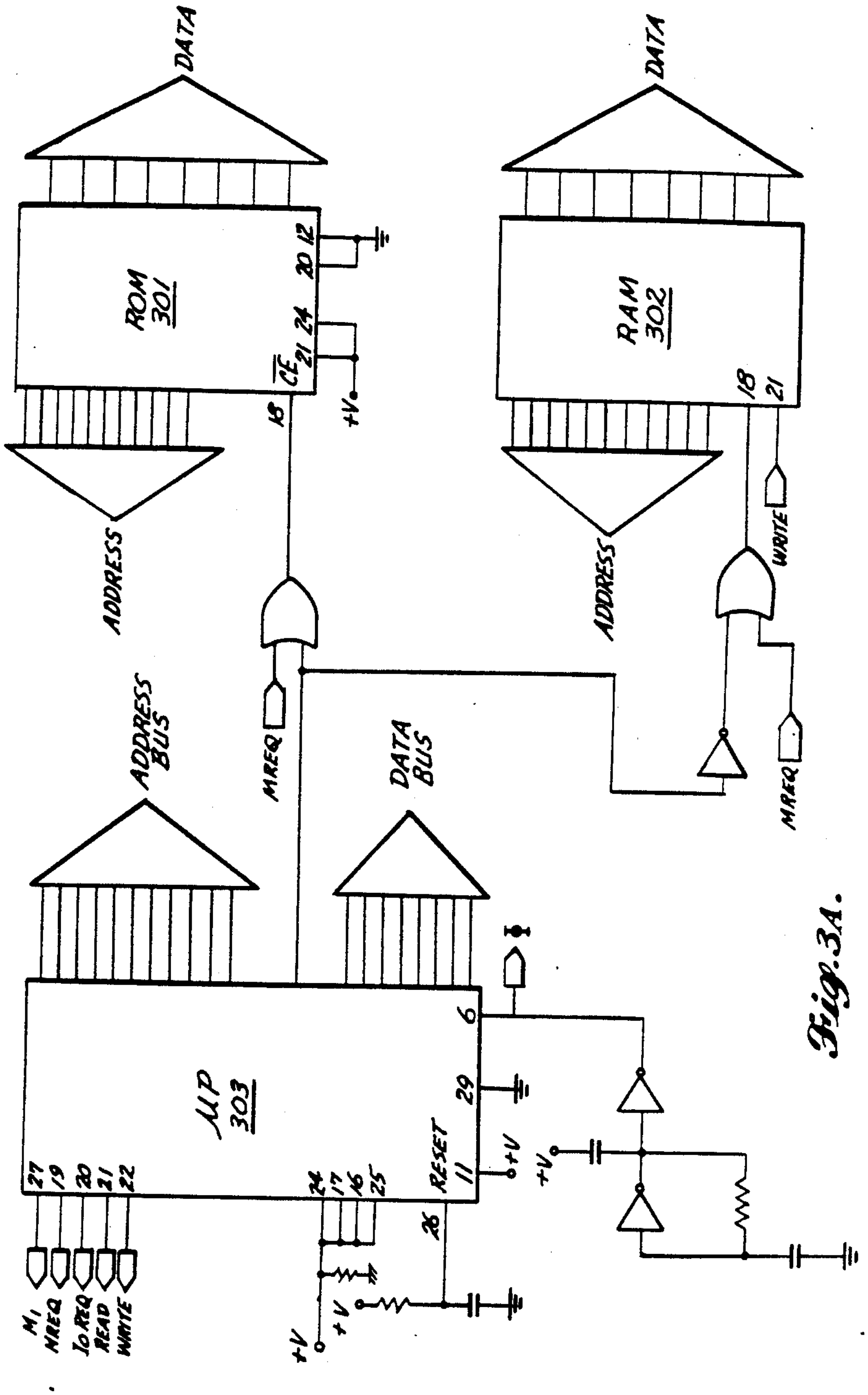
FIGS. 3A and 3B illustrate one preferred embodiment of electronic circuitry useful for implementing the embodiment of FIG. 1.
Figure 3B:
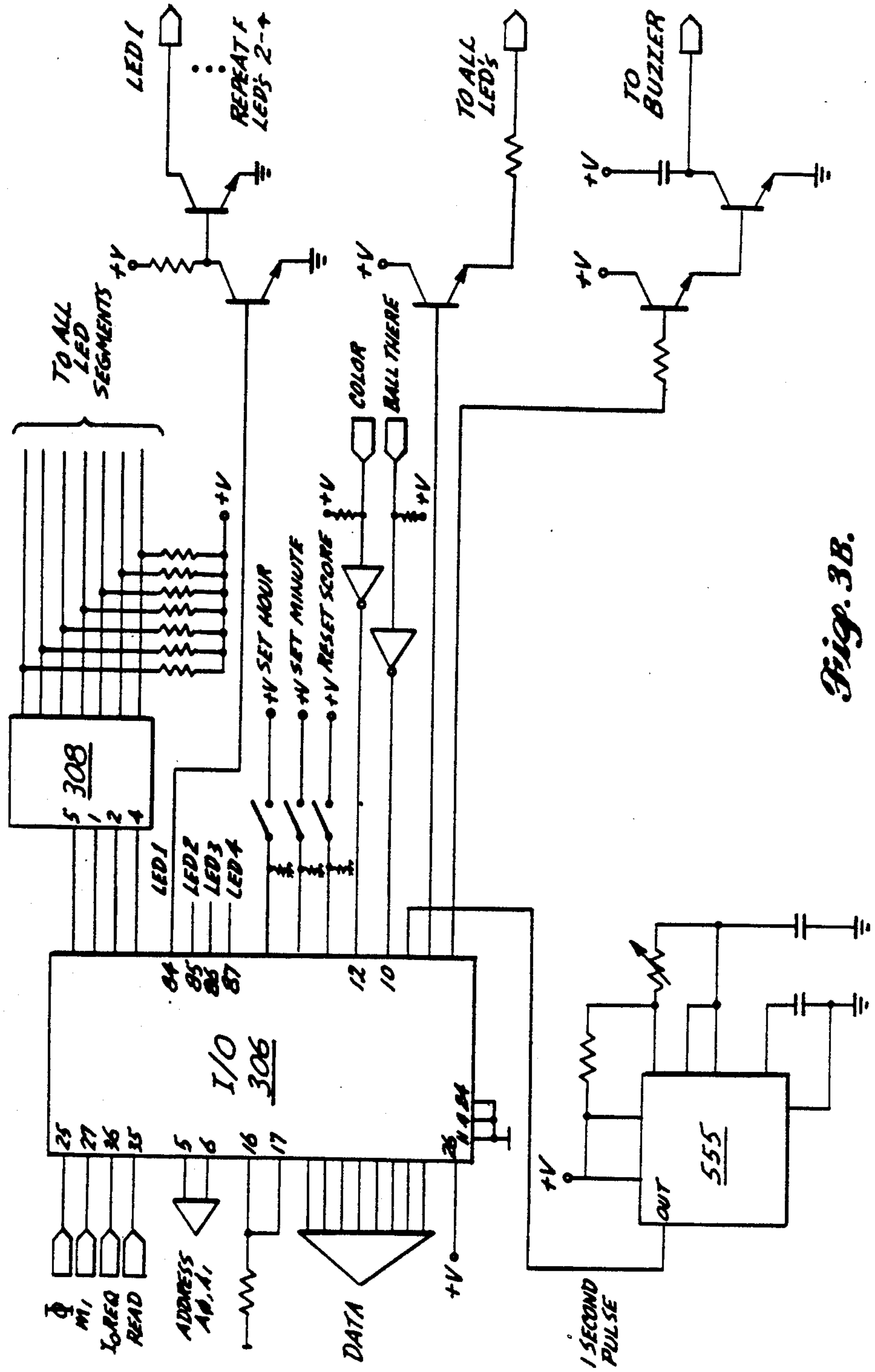

Remaining components and interconnections illustrated in FIGS. 3A and 3B (such as the 555 timer, resistors, inverting amplifiers, etc.), although necessary for proper operation of the preferred embodiment, are well understood by one of ordinary skill in the relevant arts and hence do not require further explanation here.

Figure 4:
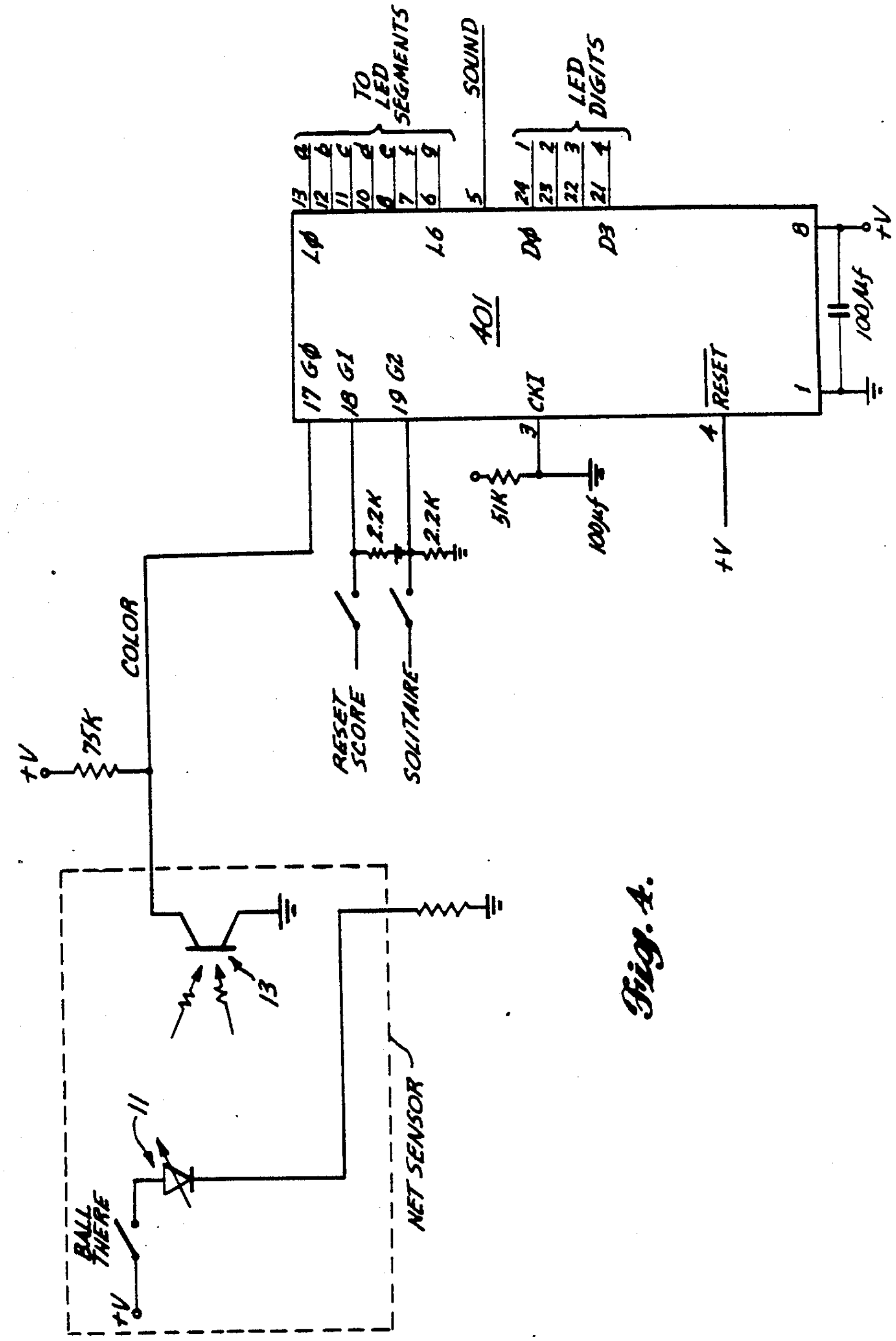
FIG. 4 is an alternative embodiment of FIG. 3.

FIG. 4 illustrates an alternative embodiment of FIGS. 3A and B wherein the circuitry and electronics thereof is integrated into a custom part thereby reducing the area required to house the electrical components. FIG. 4 illustrates such a custom part 401 (preferably a COP 410L single-chip microcontroller made by National Semiconductor), as well as the supporting electronics for this custom part. Interconnection requirements and the supporting electronics for custom part 401, in view of the explanation aforegiven for FIGS. 3A and B, and the level of detail shown in FIG. 4, are within the skill of those of ordinary skill in the art; hence, further discussion is omitted.

The electronic circuits of FIGS. 3A and 3B and 4 function in accordance with the flowcharts of FIGS. 5 and 6. As mentioned above, the principal controller may be a Z-80 microprocessor or its equivalent, or a custom part, depending upon the requirements of a given embodiment.

FIG. 5 discloses program flow when the scorekeeper is in the dual (non-solitary or competitive) mode. In block 501, the hardware is initialized and the software variables are preset. The variable SCORE(H) corresponds to the accumulated score for the home team and is displayed to the players via LEDs 3 (FIG. 1). This variable, as well as SCORE(V) (the visitor counterpart of SCORE(H)), is preset to 0. The variable COLOR, initialized to $8,000, will be explained below.

The variable SCORE DEBOUNCE effects a 260 millisecond countdown timer, the purpose of which is to prolong the minimum time within which the score-keeper will recognize two independent scores. This prolongation ensures that a single scoring event will not be recognized as multiple scoring events, a phenomenon which would otherwise occur due to the ball opening and closing the BALL THERE switch numerous times as it fell through the hoop.

In the preferred embodiment, SCORE DEBOUNCE serves to put the program in a 260 millisecond loop immediately after a score is detected. Specifically, once the BALL THERE switch opens after having been depressed by the presence of a BALL, color sampling stops, and the 260 millisecond loop begins. If, during the loop, BALL THERE recloses, color sampling is resumed and SCORE DEBOUNCE is reset to 260 milliseconds (the presumption here is that the ball has remained in the hoop from the original scoring event; hence, color sampling should (and does) resume where it left off). Eventually, of course, the ball will drop free of the hoop area and the timer loop will run for a full 260 milliseconds. Once the full 260 milliseconds expires, the color samples will be tested and the appropriate score will be incremented.

A 260 millisecond delay, though sufficiently long to obviate multiple scoring, is sufficiently short to obviate having different scoring events being erroneously treated as a single scoring event.

After initializing the variables in block 501, program flow continues to block 502 where the controller samples the RESET button. If the RESET button is depressed, flow branches to block 542 where the variables are reset to their initial values (see block 501). Then the program continues at block 503.

In block 503, SCORE DEBOUNCE is tested to ascertain whether the BALL THERE switch has remained open for 260 continuous milliseconds after the detection of a score. If it has not remained open that long, SCORE DEBOUNCE will be greater than 0 and the program will therefore branch to block 531. After delaying in block 531 for a full millisecond, flow will continue to block 530 where SCORE DEBOUNCE will be decremented, thus recognizing the millisecond delay in block 531. If SCORE DEBOUNCE then equals 1 the 260 millisecond (approximate) delay has run its course; thus program flow progresses to block 550.

At this point (block 550), a score is recognized. To accomplish the color determination (necessary to determine which party scored), the COLOR variable (which contains the accumulation of the color samples) is tested. This process is explained more fully below.

If SCORE DEBOUNCE is not greater than 0 when tested in block 503, or is not equal to 1 when tested in block 532, the controller will branch to block 504 and interrogate the BALL THERE switch. As aforenoted, this interrogation is physically performed by having the microprocessor, by standard techniques, sample BALL THERE contact 202 (FIG. 2). If the interrogation yields that the switch is open (i.e., no ball is in the hoop), no action need be taken, and the program branches to block 513 where the display and buzzers are updated. If, on the other hand, BALL THERE switch 23 is closed, a ball's presence has been detected.

If a ball has been detected, color sampling must be initiated (blocks 508–512). First, however, the 260 millisecond SCORE DEBOUNCE timer must be initialized, so that countdown timing may begin when the BALL THERE switch reopens after the ball leaves the hoop. Accordingly, in block 505, the SCORE DEBOUNCE timer is preset to 260 milliseconds. In block 506, the program delays for a full 24 milliseconds, thereby allowing the phototransistor transients to subside (recall, to conserve power, battery power is supplied to the phototransistor only when BALL THERE switch 23 is closed).

BALL THERE switch 23 is sampled after this 24 millisecond delay. If it is no longer closed, the earlier sample (block 504) is treated as noise (i.e., an error). Such switch-bouncing noise might typically occur when a ball hits the rim of the hoop, but yet fails to enter the hoop. If BALL THERE switch 23 has remained closed for the full 24 millisecond period, there is no noise, and flow continues to block 508, where ball color sampling begins.

Blocks 508–512 implement color sampling of the ball while it is in the hoop, so that a score may be attributed to the proper player. To attribute a scoring event to the proper player, a number of color samples are taken during the scoring event. This method reduces errors which would otherwise result if a single sample method were used. The results of these numerous samples are accumulated in the variable COLOR.

In the present embodiment, sampling is commenced at the closing of BALL THERE switch 23 (block 504=yes), and sampling continues so long as the switch remains closed. Once the switch opens (upon the ball leaving the hoop), SCORE DEBOUNCE counts off 260 milliseconds, after which the accumulated samples (in COLOR) are analyzed to determine the mean color sample. If the mean sample indicates the ball was relatively "light" (according to some preset threshhold), the ball is deemed to be that of the home team. If, on the contrary, the mean sample indicates the ball was relatively "dark", the ball is deemed to be that of the visitor. Scores are manipulated accordingly.

To carry out this color sampling scheme, COLOR is initialized to the value $8,000 in block 501, and after every score is reinitialized in block 553. A single color sample is taken each time the program passes through the series of blocks 504–507 (as described earlier), which sampling is physically performed by phototransistor/light-emitter means contained in the hoop (also described above). If the single sample indicates a "light" ball is in the hoop, COLOR is incremented in block 510. If the sample indicates a "dark" ball, COLOR is decremented in block 512. Blocks 509 and 511 are intended to obviate overflow (positive and negative, respectively) of COLOR by bypassing the increment/decrement blocks (510/512) when the next sample would result in overflow.

After each individual color sample, program flow loops back to block 513. In this block, the program refreshes the display LEDs and, if appropriate, sounds the proper scoring buzzer. Once this is performed, program flow returns to the main loop. If the ball is still in the hoop, the ball's color will again be sampled when the program reaches block 508. This process continues until the ball leaves the hoop.

When the ball has left the hoop and the SCORE DEBOUNCE timer has expired, the controller will be at block 550, where the average ball color will be determined and appropriate scores updated. This operation is easily performed by comparing the contents of the COLOR variable with its initialized value of $8,000 (block 550). If the net number of "light" samples (increments) was greater than the net number of "dark" samples (decrements), COLOR will be greater than $8,000, and the ball will be deemed "light". Similarly, if the net number of "dark" samples (decrements) was greater than the net number of "light" samples (increments), COLOR will be lesser than $8,000, and the ball will be deemed "dark".

In the event that COLOR is greater than $8,000, the score corresponding to the player using the light ball (SCORE(H)) will be incremented (twice) in block 554. Additionally, a program flag will be set (block 555) in order to ring the home team's buzzer when the program reaches block 513. If COLOR was less than $8,000 similar steps will be taken, though of course substituting the "dark" player's score and buzzer.

Once the score and buzzer variables are updated to reflect the most recent score, the COLOR variable is reset to its initial value ($8,000). Finally, the controller branches again to block 513 where the LEDs are changed to reflect the new point total. Also, the buzzers are activated, if appropriate. At this point, the last scoring event is completed, and the scorekeeper awaits the next scoring event.

The cyclical process described above continues for the duration of the game. The winner, of course, is the player or team who scores the most points within the arbitrarily chosen time frame.

FIG. 6 demonstrates program flow when the scorekeeper is operated in the solitary mode. (switch 33 in the "solitaire" position). In this mode, any ball passing through hoop 15 adds 2 points to the home team's score (LEDs 3), and the visitor's score (LEDs 5) is converted from a score display into a countdown clock which displays the time remaining in the game. In playing the game, the lone player attempts to maximize his points within the given time period, and continuously can observe his progress by watching the score and the clock. Each time the player passes a ball through the hoop, the home team's score is increased by two, and the home team buzzer is sounded. Further, when time expires the visiting team's buzzer is sounded, thus indicating the end of the game. When the clock in the solitaire mode expires, further scoring will be disabled. This is shown in FIG. 6, Boxes 603 to 653 to 602 to 603.

In block 601 the hardware and software are initialized. COUNTER is a counter in which each unit represents 1 millisecond. After each 1,000 unit decrementation of this counter, the scorekeeper clock will be decremented by 1 second and COUNTER will be reset. SCORE DEBOUNCE serves the same function as it did in the dual mode: ensuring that that BALL THERE contact switch 23 has remained opened for 260 continuous milliseconds after the last scoring event before a ball's presence in the hoop will be recognized for purposes of a subsequent scoring event. TIMER represents the number of seconds displayed on the scorekeeper clock (visitors score), which indicates the time remaining in the game. SCORE, the lone player's (or team's) score, is displayed on the home team's display (LEDs 3).

After power-up and checking to ensure that there is no current reset (block 602), program flow branches to block 603 where TIMER is checked to ascertain whether there is time remaining in the game. If time has elapsed (TIMER=0), the game has been completed, and flow branches to block 653 where the display LEDs are refreshed. Once time has expired, program flow continues in this small loop until reset is depressed and another game is initiated.

If TIMER has not yet reached 0 when interrogated at block 603, the controller branches to block 604, where SCORE DEBOUNCE is tested. If SCORE DEBOUNCE is greater than 0, there has been a valid scoring event; for SCORE DEBOUNCE attains a non-zero value only by being preset—subsequent to a scoring event—in block 606. The program recognizes such a prior scoring event by branching to block 650. In block 650, SCORE DEBOUNCE is decremented to acknowledge that the BALL THERE switch has remained opened for an additional millisecond after the scoring event (i.e., one more program loop has elapsed).

If SCORE DEBOUNCE is equal to one after this decrement, the BALL THERE switch has been open for the full 260 (approximate) millisecond period. If this is the case, SCORE is twice incremented (in block 652), thus finally scoring the event which initiated the 260 millisecond delay process.

Once SCORE is incremented in block 652, flow moves to block 653 where the display and buzzers are updated as explained generally in the dual mode game. In the solitary mode, however, each scoring event causes the home team buzzer to sound, and the visiting team's buzzer is sounded only when the time remaining in the game (as displayed upon visitor's score, LEDs 5) reaches 0.

If SCORE DEBOUNCE is not greater than 0 when tested in block 604 (i.e., if no current scoring event has set it to a non-zero value), or if it is not equal to 1 when tested in block 651 (i.e., the 260 millisecond post-scoring event delay has not fully expired), then program flow will branch to block 605.

In block 605, the BALL THERE switch is tested. If the test indicates that the BALL THERE switch is closed, a scoring event is recognized, and the controller therefore causes the program to branch to block 606. In block 606, SCORE DEBOUNCE is set to 260 milliseconds. Setting SCORE DEBOUNCE to 260 milliseconds (from its initial value of 0) enables the program subsequently to answer block 604 affirmatively, and thereby ultimately to branch to block 652. Without so setting SCORE DEBOUNCE to a non-zero number, the test of block 604 always will result in a branching to block 605, and SCORE will never be incremented. Setting SCORE DEBOUNCE to 260 therefore enables the program later to begin its countdown to zero and actual recognition of the scoring event.

Once SCORE DEBOUNCE is set to 260 milliseconds in box 606, or if the BALL THERE switch is found not to be closed in the block 605 test, the controller branches to block 607. Block 607 is the first of a series of blocks, the design of which is to effect a reasonably accurate timer. Block 607 effects a 1 millisecond delay which ensures that the total time required to pass through a single full program loop in the solitary mode is approximately 1 millisecond (the time required to pass through the other blocks is negligable in comparison). In block 608, the controller decrements the 1 millisecond counter to recognize that an additional millisecond of time has elapsed (an additional program loop has been run). Then (in block 609) said counter is checked to ascertain whether a full second has elapsed and thus whether the 1 second timer must be decremented (block 611). If so, the counter is reset (block 610) and the TIMER variable is decremented (block 611). If not, flow branches to block 653 where the display is updated and the program continued until time elapses.

In the solitary mode, the controller is thus programmed so that after depressing the RESET button, a player can shoot "against the clock" while his score and the time remaining in the game are displayed on the automatic scorekeeper. Such a game also affords the player a means by which he can guage his daily progress (the raw score made before counter time-out).

As aforenoted, the invention has been described in detail with respect to an embodiment useful for scorekeeping a basketball game, although the scope of the invention extends to many other games and to non-game environments.

Examples of the invention's applicability to other games include:

(1) Football/baseball tossing game. Turn the "hoop" sideways and attempt to throw the ball therethrough. (Dual/solitaire modes).

(2) Soccer game. Implant sensors into a soccer goal in lieu of a hoop. (Dual/solitaire modes).

(3) Tennis/soccer/baseball/gun target practice. Use solitaire mode to count the score and display the time remaining in the game.

Of course these games are only exemplary of the many environments (including non-game environments) in which this invention may be used, and their enumeration here should not be interpreted as limiting the scope or environment of this invention, which is defined only by the following claims.

What is claimed is:

1. Game apparatus for use in a game providing automatic scoring comprising:

a plurality of game balls each being of a particular color, means defining a single scoring area for said game when one of said plurality of game balls is found within said scoring area;

a sensor for sensing the presence of one of said balls in the single scoring area and producing a scoring event signal , said sensor including light means for illuminating the one of said game balls in the signal scoring area responsive to said scoring event signal and photoelectric means for receiving light reflected by the one of said game balls in said scoring area, and for providing a plurality of sensor output signals indicative of the reflectivity of the one of said game balls and for averaging the plurality of signals to determine reflectivity in order to reduce errors, with which reflectivity of said one of said game balls said sensor identifies said particular one of said game balls by its color, said sensor including delay means for delaying the beginning of sensor signals indicating reflectivity and lengthening the shortest time within which two consecutive scoring event signals can be generated, thereby assuring that noise signals are not sensed as a scoring event and no single game ball is sensed as multiple game balls; and a score-keeping means having display means for a plurality of a scores for automatically monitoring said sensor output signals and incrementing a score on said display means corresponding to a particular game ball detected in said scoring area.

2. A sensor as in claim 1 wherein said shortest time is at least 200 milliseconds.

3. A gate scorekeeping apparatus for use in automatically scoring a game, comprising:

a net area which defines a scoring area for said game when one of a plurality of game balls is found within said net area;

a sensor for sensing the presence of said balls in said net area and outputting a signal indicative thereof;

timer means for selectively providing a time period defining the playing time of said game;

scorekeeping means, including at least two outputs, for automatically monitoring said sensor output signals and said balls and recording scores thereof, said scorekeeping means having at least two modes of operation:

a competitive mode during which said distinctive balls are uniquely identified as their presence is sensed in said net area, and scores thereby are respectively posted on said two outputs, which two outputs are uniquely associated with said balls, and a solitaire mode during which any score effected by any of said balls is cumulatively registered on one of said outputs while the other of said outputs indicates the time remaining in said time period provided by said timer means;

switch means for selecting one of said competitive and solitaire modes; and reset means for restarting said timer means to begin one of said time periods, during which said scorekeeping means automatically records game ball scoring in accordance with the selection of said modes by said switch means.

4. An apparatus as in claim 3, wherein said game is basketball and said net area is a basketball hoop.

5. An apparatus as in claim 3, wherein said scorekeeping means includes a microprocessor programmed to selectively operate in accordance with said competitive and solitaire modes.

6. An apparatus for automatically scoring a game played with a plurality of balls having substantially the same physical dimensions, but at least one distinctive trait each, comprising:

sensing means for sensing whenever a ball is in scoring position;

first indicator means for indicating scores as sensed by said sensing means;

timer means for resettable timing a time period defining playing time for said game;

reset means for resetting said timer means so as to initialize said timer means;

second indicator means, responsive to said timer means, for displaying time remaining in said time period;

controller means for selectively suspending operation of said first and second indicator means and establishing alternative functions therefor in a defined alternative operation mode of said apparatus;

said apparatus further including identifying means for uniquely identifying said balls based on their distinctive traits whenever said alternative mode is selected, and respective scoring means for causing during said alternative mode said controller means to establish alternative function of said first and second indicator means such that said indicator means are automatically and respectively responsive to said identifying means so as to respectively record scores by at least two of said balls;

said apparatus further including a selector means for placing said controller in said alternative mode defined as a competitive play mode, or holding said controller in its primary mode defined as a solitaire play mode, wherein during said solitaire play mode said apparatus cumulatively tallies scores by any of said balls on said first indicator means while displaying remaining time in a game on said second indicator means, while during said competitive play mode said apparatus respectively tallies on said first and second indicator means cumulative scores made by at least two of said balls.

* * * * *